(12) United States Patent
Singh et al.

(10) Patent No.: US 6,490,597 B1
(45) Date of Patent: Dec. 3, 2002

(54) STORED DATA OBJECT MANAGEMENT AND ARCHIVE CONTROL

(75) Inventors: Munindar Paul Singh, Cary, NC (US); Billy Gayle Moon, Apex, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/353,201

(22) Filed: Jul. 14, 1999

(51) Int. Cl.[7] ............................................. G06F 17/30
(52) U.S. Cl. ...................... 707/204; 707/100; 707/200; 707/206; 711/161; 711/162
(58) Field of Search ........................... 707/1, 204, 205, 707/203, 206, 200, 100; 717/11; 711/133, 134, 161, 159, 162

(56) References Cited

U.S. PATENT DOCUMENTS

| | | | | |
|---|---|---|---|---|
| 4,899,299 A | * | 2/1990 | MacPhail | 364/570 |
| 5,237,651 A | | 8/1993 | Randall | 395/148 |
| 5,353,430 A | * | 10/1994 | Lautzenheiser | 395/425 |
| 5,515,490 A | | 5/1996 | Buchanan et al. | |
| 5,590,308 A | * | 12/1996 | Shih | 395/463 |
| 5,592,432 A | * | 1/1997 | Vishlitzky et al. | 365/230.03 |
| 5,822,781 A | | 10/1998 | Wells et al. | |
| 5,835,911 A | * | 11/1998 | Nakagawa et al. | 707/10 |
| 5,873,108 A | | 2/1999 | Goyal et al. | 707/507 |
| 5,958,009 A | | 9/1999 | Friedrich et al. | |
| 6,157,930 A | * | 12/2000 | Ballard et al. | 707/203 |
| 6,208,996 B1 | * | 3/2001 | Ben-Shachar et al. | 707/104 |

\* cited by examiner

*Primary Examiner*—Jean M. Corrielus
*Assistant Examiner*—Joon H. Hwang
(74) *Attorney, Agent, or Firm*—Coats & Bennett, P.L.L.C.

(57) ABSTRACT

A method for maintaining data objects in memory introduces metrics for freshness and interestingness of the data object. A freshness estimate is defined as the length of time that the data contained within the data object is expected to remain correct from the date that the object was last known to be valid. The interestingness estimate is defined as the length of time that the data object is expected to retain its usefulness to the user from the time that the data object was last used. The freshness estimate and interestingness estimate are stored in the data object along with a reference date. The freshness estimate, interestingness estimate, and reference date are updated or confirmed each time the data object is accessed. A maintenance program is periodically invoked to determine whether the data objects are outdated by comparing the time estimates associated with each data object to that object's reference date. Objects found to be outdated are candidates for removal from the system.

36 Claims, 4 Drawing Sheets

STORED DATA OBJECT MANAGEMENT AND ARCHIVE CONTROL

FIELD OF THE INVENTION

The present invention relates generally to an information management systems implemented by a computer and, more particularly, to a system for maintaining data objects stored in memory.

DESCRIPTION OF THE PRIOR ART

Upcoming communication devices, such as a personal digital assistants (PDA), combine the features of a mobile telephone and computer. These devices are designed to support communications and interactions among users. One way in which these devices facilitate interactions among users is by storing information about persons or entities with whom the user interacts. One simple example would be an address book that lists the telephone number and address for each contact. Such information can be stored in virtual business cards. In emerging communication devices, users have the ability to exchange virtual business cards among themselves. Thus, a user can accumulate a large number of business cards.

The accumulation of cards by a user presents several problems. First, the user may accumulate cards that, over time, become unimportant. In devices with limited memory, a card that is not actively used consumes precious memory. Secondly, the information contained in a business card may change over time so that the information becomes no longer reliable. There is not currently any method to identify stale or unused business cards so that they can be removed.

One way to manage business cards is for the user to manually remove those cards that become stale or uninteresting. Unfortunately, this method requires the user to take time to periodically review and remove unwanted cards. For the above reasons, relying on the user to purge records manually is not a good solution to the problem. Another technique for removing contacts is to remove each contact that has not been accessed within a certain time period, such as one month. However, this simplistic approach treats all contacts as having the same aging process, which is typically not the case. Contacts that are never accessed should become candidates for removal much sooner than files in which there is some kind of infrequent access.

Thus, there is a need for further improvements in information management software to make it easier and less cumbersome to update and maintain a database of contact information.

SUMMARY OF THE INVENTION

The present invention is a method for maintaining card objects in a computer system. According to the present invention, a plurality of card objects are stored in the memory of a computer. Each card object includes a field for storing a reference date. Each card object further includes one or more time constant fields for storing time estimates. The disclosed embodiment includes two time estimates— the freshness estimate and the interestingness estimate. The freshness estimate is an estimate of the length of time that the data contained in the card object is expected to remain reliable or fresh since the date that it was last accessed. The interestingness estimate indicates the length of time that the card object is expected to remain relevant or interesting to the user from the date that it was last accessed.

When a card object in the database is accessed, an update procedure is invoked. The purpose of the update procedure is to update the freshness and interestingness estimates based upon a predetermined rule set. More particularly, the freshness estimate is increased when a new version of the card object is obtained and the elapsed time since the card object was last accessed is greater than the current freshness estimate. The freshness estimate is decreased when the data contained in the card object is unchanged and the elapsed time since the card object was last accessed is less than the current freshness estimate. The interestingness estimate is increased when the elapsed time since the card object was last accessed is greater than the current interestingness estimate.

A separate maintenance procedure is periodically invoked to iterate through all of the card objects in the database and to remove those card objects deemed to be stale or uninteresting. Further, this maintenance procedure may be invoked when available memory is running low. A card object is deemed to be stale if the elapsed time since the date on which the card object was last accessed is greater than the current freshness estimate. A card object is deemed to be uninteresting if the elapsed time since the card object was last accessed is greater than the current interestingness estimate. The preferred method for removing a card object is by moving it to a data archive. If the card object is subsequently requested, it can be restored to active memory.

Using the method of the present invention, stale or irrelevant objects can be moved from memory and archived automatically without human intervention. This method frees up memory for objects which are used most frequently, while less frequently used objects are stored in an archive. This invention is particularly useful in those situations where the primary memory for storing objects is somewhat limited. Stale and irrelevant objects can be moved from primary memory to a data archive and recalled when needed. The present invention also increases the speed of look-ups by reducing the number of objects in the memory.

DETAILED DESCRIPTION OF THE PREFERRED EMBODIMENT

Figure 1:
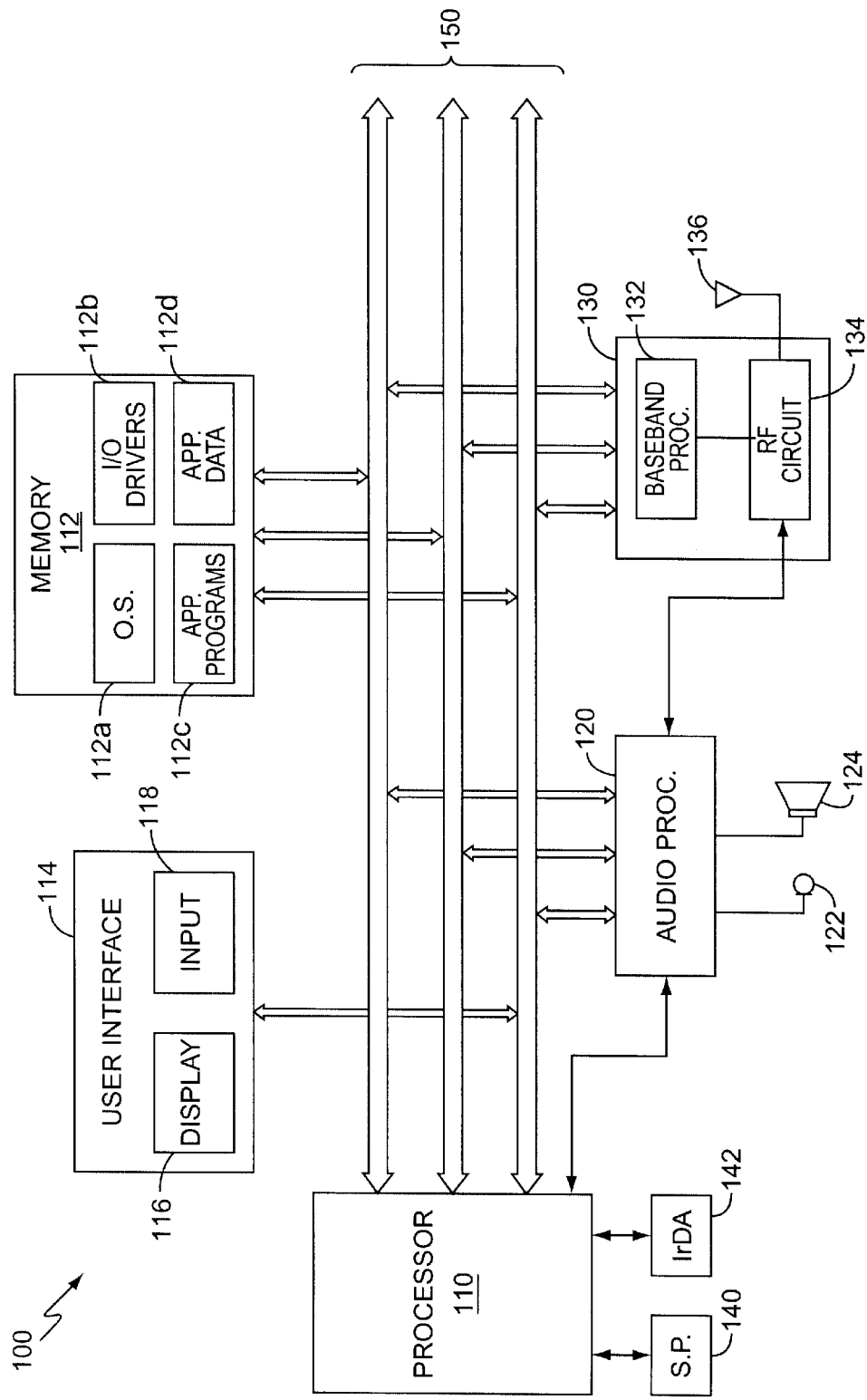
FIG. 1 is a block diagram of a communication device that implements the method of the present invention for maintaining data objects.

Referring now to FIG. 1, a personal digital assistant (PDA) that uses the present invention is shown therein and indicated generally by the numeral 100. PDA 100 combines a cellular radio transceiver with a hand-held computer. PDA 100 includes a memory for storing contact information, such as telephone numbers, mailing addresses, e-mail addresses, and web page addresses. This information is contained in a series of card objects that can be distributed among many users. The invention is a method for managing the card objects in memory and archiving those that are considered to be outdated. While the disclosed method is implemented in a PDA, it will be apparent to those skilled in the art that the method of the present invention can also be used in software applications running on various types of computers including desktop computers, laptops, notebooks, sub-notebooks, PDAs, etc.

As shown in FIG. 1, the PDA 100 includes a microprocessor 110, program memory 112, user interface 114, a display 116, an input device 118, audio processing circuits 120, and a transceiver section 130 connected together by a system bus 150 having address, data, and control lines. The PDA may also include an infrared and serial interfaces, 140 and 142 respectively, for exchanging card objects with other devices. Power is supplied by a battery.

The microprocessor 110 controls the operation of the device according to instructions stored in memory 112. The processor 110 can be any commercially available or custom microprocessor suitable for an embedded application. The memory 112 is representative of the overall hierarchy of memory devices containing the software and data used to implement the functionality of the computing device 100. The memory 112 can include, but is not limited to, the following types of devices: cache, ROM, PROM, EPROM, EEPROM, flash, SRAM, and DRAM. As shown in FIG. 1, the memory 112 may hold four major categories of software and data used in the computing device: the operating system 112a; the input/output (I/O) device drivers 112b; the application programs 112c; and the application program data 112d.

The operating system 112a is typically designed for embedded applications and, preferably, is relatively compact to make the most efficient use of the memory. One such example of an operating system meeting these criteria is the EPOC operating system sold by Symbian Ltd., Sentinel House, 16 Harcourt St., London W1H 1DS UK, which was developed for portable hand-held computers and can be used in a preferred embodiment of the present invention.

The I/O device drivers 112b include software routines that are accessed through the operating system 112a by the application programs 112c to communicate with devices such as the display 116, certain components of the memory, and I/O ports such as a serial port 140 or infra red (IR) port 142 for transferring data to another device or system. The static and dynamic data used by the application programs 112c is represented by the application data 112d.

The application programs 112c comprise the programs that implement the various features of the computing device 100. The application programs may include software to implement features such as e-mail, Internet access, word processing, or contact manager. The present invention will be described below in the context of a contact manager program residing in memory 112c.

The user interface includes a display 116 and a user input device 118. Display 116 enables the user to view contact information stored in the contact database. The user enters contact information via input device 118. The input device 118 may be any known input device for a computing device including without limitation a keypad, pointing device (such as a mouse, trackball, touch pad, or light pin), or touch screen.

The transceiver section 130 is a fully functional cellular transceiver capable of transmitting and receiving radio signals. The details of transceiver section 122 are conventional and well known to those skilled in the art. To briefly describe, the transceiver 130 of the preferred embodiment includes a digital signal processor 132 for processing signals transmitted and received by the device 100, and an RF circuits 134 connected to an antenna 136. Since transceivers 130 are well-known in the art and are not per se material to the present invention, further description of the transceiver 130 is omitted for the sake of brevity.

The audio processing circuits 120 is shared by the transceiver 130 and application programs 112c executed by the processor 110. A microphone 122 converts audible sounds, such as voice, into electrical signals that are input to the audio processing circuits 120. The processed audio signals can be transmitted by said transceiver 130 or used by an application program in memory 112c. A speaker converts audio signals output by said audio processing circuits into audible sounds that can be heard by the user. The audio signals may be received by said transceiver 130, generated by an application program in memory 112c, or retrieved from memory 112d.

Contact information is contained in virtual cards stored in memory 112d. The virtual cards are implemented as software card objects that encapsulate data and methods for accessing and manipulating the data contained in the card object. The contact information may, for example, include the contact's name, one or more telephone numbers, pager number, e-mail address, web page address, and other contact specific information. The card object may include other information, such as the contact's preferences, times for reaching the contact at the different addresses, or other contact specific information. The type of information stored in the card object is not a material aspect of the invention.

It is presumed that information about a particular contact contained in a card object is not static, but will change over time. It is further presumed that some contacts, and therefore the corresponding card object, will remain relevant only for a finite period of time and will not be needed indefinitely. The present invention is a method for maintaining card objects that are accumulated by the user over time.

The present invention introduces metrics for the freshness and interestingness of card objects or other software objects. Both metrics are given in terms of time. The freshness metric or estimate is the expected time the current version of an object will remain accurate from a reference date. The interestingness metric or estimate is expressed in terms of the expected time an object will remain interesting to the user from a reference date. The freshness and interestingness estimates can be revised up or down, but only when the object is accessed, either because of a received communication or because of a locally-generated request. This feature is important because any approach that required computation under other circumstances would be intractable since it would have to update data structures for all objects at all times.

According to the present invention, each card object includes a date field containing the reference date for the freshness metric; the reference date is the date the object was last known to be valid. For the interestingness metric, the reference date is the date the card object was last accessed. The method is set up so that the data object is revised or confirmed whenever it is accessed. Therefore, the date of last access can also be used as the reference date for the freshness metric. Thus, only one reference date needs to be stored.

Software running on the communication device ensures that the card object is updated when used and that the freshness date is also updated. If the card is not used over a long period of time, the freshness date is not updated. A card that is not actively used is considered uninteresting or not relevant to the user. A card whose version is not likely to be correct is considered stale. Uninteresting or stale cards are considered to be candidates for removal. As will be explained more fully below, a card maintenance procedure is periodically invoked to remove uninteresting or stale cards.

The present invention uses two time estimates to determine the interestingness and freshness of a card object referred to herein as the interestingness estimate and freshness estimate. The freshness estimate is the length of time that the data contained in the object is expected to remain accurate or reliable. By way of example, a card object may have a freshness estimate of thirty (30) days. If the associated card object is not accessed within a thirty (30) day period, the information is expected to have changed and is deemed to be stale and, therefore, no longer reliable. The interestingness estimate is the length of time that the card object is expected to remain relevant or useful (i.e. interesting). For example, the associated card object may have a interestingness estimate of forty days. If the card object is not accessed within forty days, the card object is deemed to be unimportant or not useful and should be removed from memory.

When a card object or object is first created, the reference date, the interestingness estimate, and the freshness estimate are all initialized to predetermined default values. The current date is assigned to the reference date. Any arbitrary value can be assigned to the interestingness estimate and freshness estimate, since these values will be updated automatically. It is suggested, however, that the initial values of these time estimates be set to thirty days. Once created, the time estimates will be evaluated and updated each time the card object is accessed or used.

When a card object is used, an update procedure is invoked. The update procedure computes the elapsed time period from the reference date (usually the date the object was last accessed). The elapsed time period is compared to the time estimates associated with that card object. The update procedure may increment or decrement the time estimates, or may leave the time estimates unchanged. The update procedure also updates the reference date to the current date. Periodically, a maintenance procedure is invoked to remove or archive outdated card objects from the database. The maintenance procedure compares the elapsed time from the reference date to the time estimates. Those card objects deemed to be stale or no longer interesting are removed from the database. Card objects that are removed may be stored in an archive or deleted.

Figure 2:
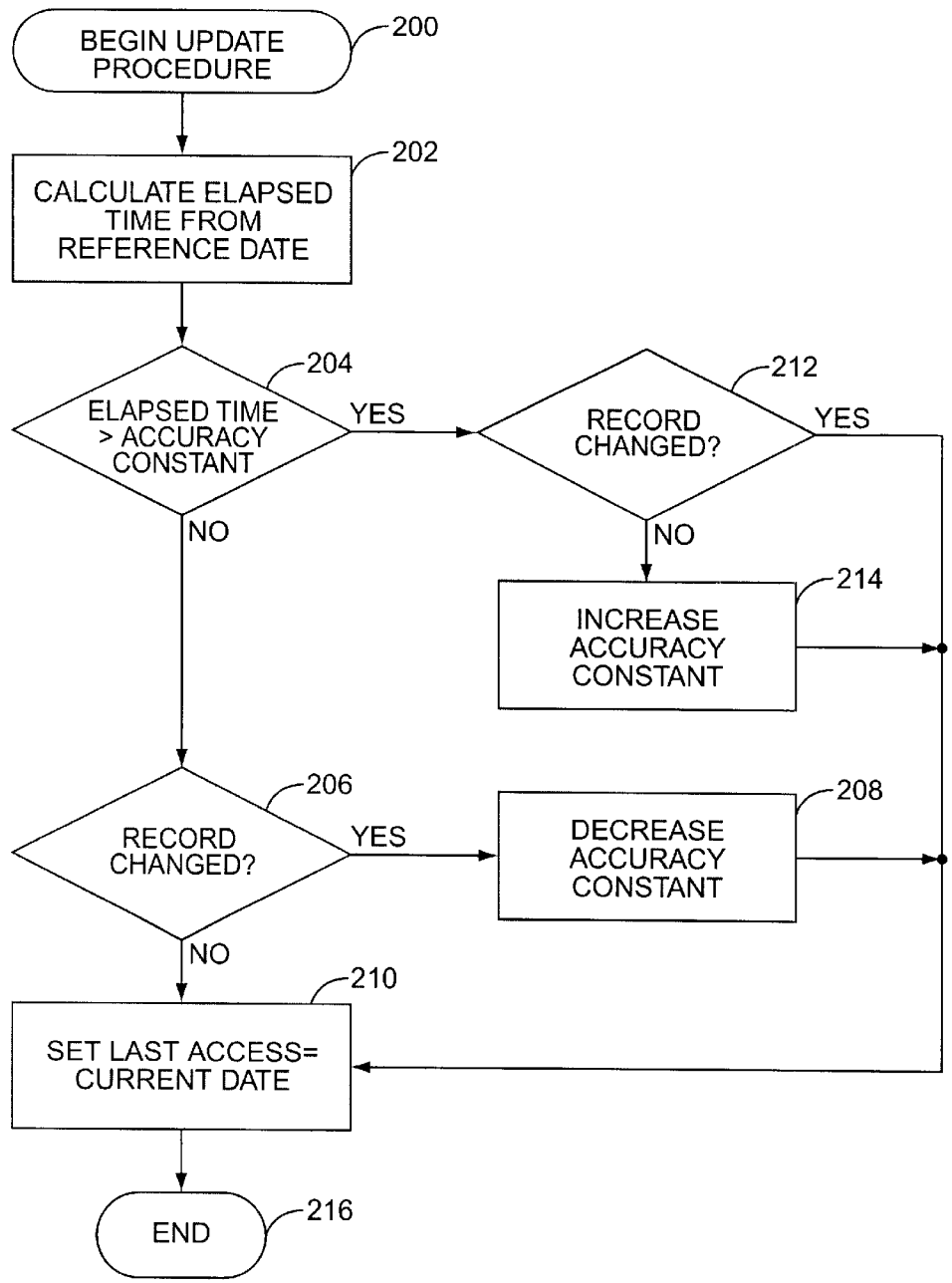
FIG. 2 is a flowchart illustrating the procedure for updating the freshness estimate of an object stored in memory.

FIG. 2 is a flow chart illustrating an exemplary method for updating the freshness estimate. This method is invoked when the card object is accessed. This method may also be invoked when a communication involving the corresponding contact is made or received. For example, the update method can be called to update a card object when a call is placed to or received from the corresponding contact. The update method computes the elapsed time E from the reference date (block 202). The elapsed time E is compared to the current value of the freshness estimate F to determine whether the card object is stale or fresh (block 204). If the elapsed time is greater than the value of the freshness estimate F, then the card object is considered to be stale. Otherwise, the card object is considered to be fresh.

If the card object is fresh (E<F), the update method will determine whether a new version of the card object is obtained (block 206). If a new version of the card object is obtained, then the freshness estimate F is revised down (block 208) since the original estimate of the time that the card object would remain fresh was overestimated. The new freshness estimate F is established as the previous freshness estimate $F_{OLD}$ less the product of a constant alpha A multiplied by the difference between the previous freshness estimate $F_{OLD}$ and the elapsed time E [$F_{NEW}=F_{OLD}-A(F_{OLD}-E)$]. The current date is then stored in the reference date field of the card object (block 210) and the updated card object is written to memory. The method then terminates (block 216). If the information within the card object is not changed, the freshness estimate F remains the same. The reference date field D is updated to the current date (block 210) and the procedure terminates (block 216).

If the card object is stale (E>F), the information within the card object is considered to be stale or unreliable, meaning there is a likelihood that the information is not correct. The update procedure may prompt the user to either confirm or change the information. The update method will determine whether a new version of the card object is obtained (block 212). If so, the freshness estimate F is not updated since the prediction that the information would change in the designated time interval proved correct. The reference date is set to the current date (block 206) and the card object is then returned to memory. If the existing card object is still valid, however, the freshness estimate F is assumed to be underestimated. In this case, the update method increases the value of the freshness estimate F according to a predetermined formula. The new freshness estimate is calculated as the previous freshness estimate $F_{OLD}$ plus the product of a constant beta B multiplied by the difference between the previous freshness estimate $F_{OLD}$ and the elapsed time E [$F_{NEW}=F_{OLD}-B(F_{OLD}-E)$]. The reference date is recorded as the current date (block 210) and the updated card object is written to memory. The update method then terminates (block 216).

The freshness estimate F is updated or confirmed each time the card object is used or accessed. The values of alpha A and beta B determine the amount of adjustment made during each update. In the disclosed embodiment, alpha A and beta B are both in the range of between about 0 to 0.5 so that learning by the system is not jerky.

Figure 3:
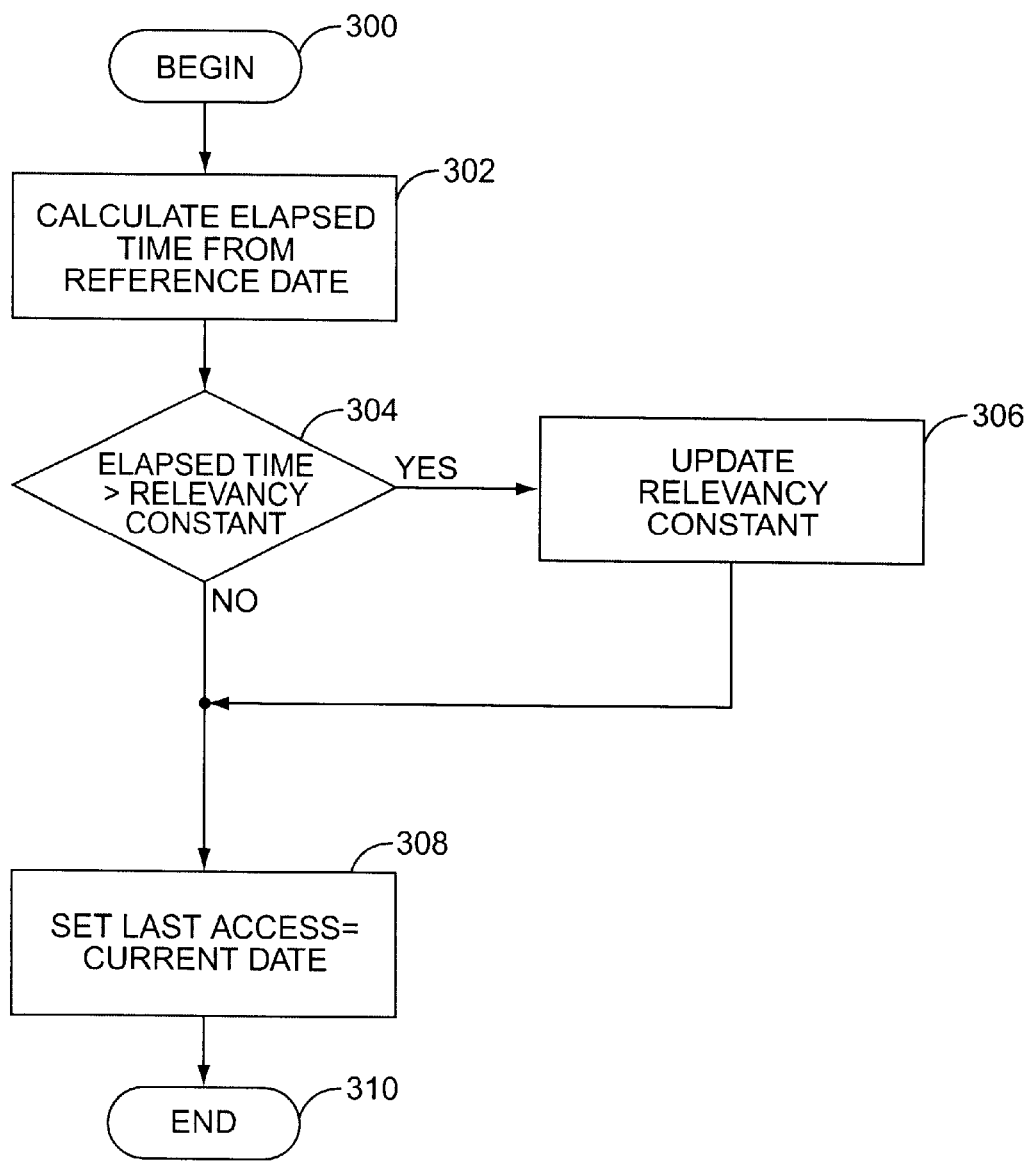
FIG. 3 is a flowchart illustrating the procedure for updating the interestingness estimate of an object stored in memory.

The interestingness estimate I is updated when the object is accessed as shown in FIG. 3. The elapsed time E from the reference date D is computed. The update method determines whether the elapsed time E is greater than the value of the current interestingness estimate I (block 304). If so, it is presumed that the interestingness estimate I was previously underestimated since the card object retained usefulness longer than expected. Therefore, the interestingness estimate I is increased (block 306). On the other hand, if the value of the interestingness estimate I is greater then the elapsed time Es the interestingness estimate I is left unchanged since the prediction that it would be useful proved correct. In both these cases, the date of access is set as the present date (block 308) and the card object is placed in memory when finished by the user (block 216).

The interestingness of a card object may be dependent upon another variable, such as the object's importance. For example, an importance variable (IMP) can be defined and used to index arrays giving the initial value of the interestingness estimate and maximum value of the interestingness estimate. The first array gives the initial interestingness estimate for a card of importance level IMP. The second array gives the maximum interestingness estimate for a card of importance level IMP. The first array is used to initialize the interestingness estimate when the object is created. The second array is used as an upper limit on the value of the interestingness estimate. That is, the interestingness estimate will not be incremented beyond the value given in the second array.

A maintenance method is used to periodically review the card objects contained within memory 112 and to archive outdated files. This is important for maintenance of the system since card objects within the memory accumulate and there must be a means of purging the outdated and/or unused card objects. This is especially important in systems that have limited memory and are not capable of maintaining copious amounts of card objects. The maintenance method determines the elapsed time E from the reference date D and compares this against the freshness and interestingness estimates. Card objects in which the elapsed time E is greater than one or both of the time estimates are considered candidates for removal. They may be removed automatically by the systems. Alternatively, the user can be prompted to remove the objects.

Card objects that are removed from the memory 112 may be processed in a variety of manners. The removed card objects may, for example, be placed in an off-line memory or archive. These card objects may stay in the archive until requested again by the user and then returned to the memory 112 with the time constants reset as necessary. Alternatively, card objects that are removed from the memory 112 may be deleted. It is to be understood that the present invention covers a variety of methods for moving card objects to and from the memory.

Figure 4:
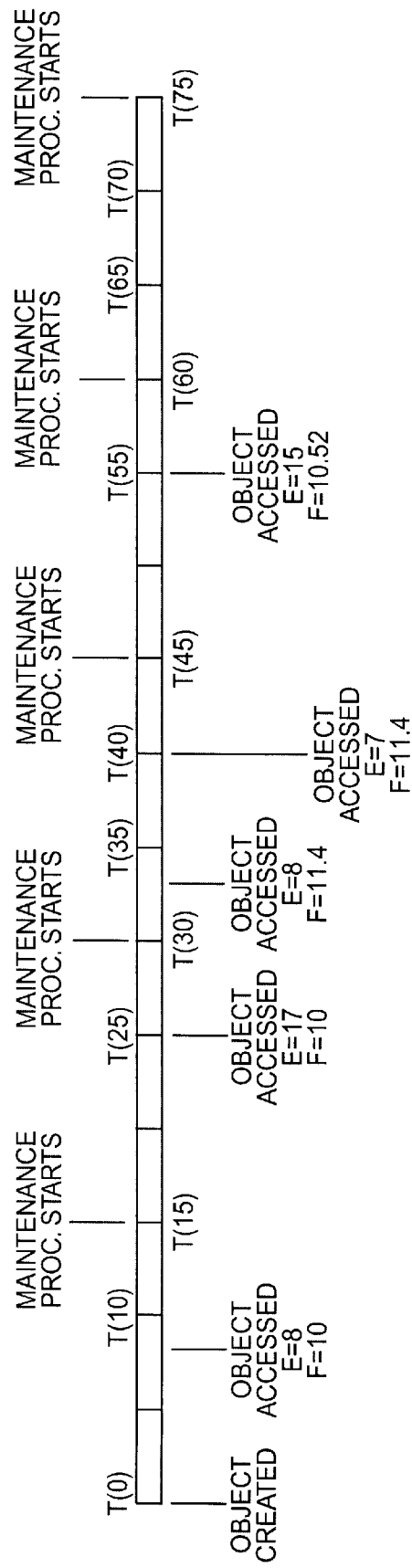
FIG. 4 is a timeline illustrating the maintenance and updating of the freshness estimate.

FIG. 4 is a time chart illustrating one example of how the version control method works. A new card object is created at time t(0) having a freshness estimate arbitrarily set at 10. The maintenance procedure is invoked every 15 time increments and determines which card objects to archive. Alpha and beta are arbitrarily established as 0.2.

The card object is first accessed at time t(8). The elapsed time E since the last access is 8. No new or updated information is obtained for the card object. Since the elapsed time E is less than the freshness estimate, the freshness estimate stays at 10 and the reference date is set to 10.

At time t(15), the maintenance procedure is invoked. The elapsed time E from the reference date is 7. The current freshness estimate F is 10. Since the elapsed time E is less than the freshness estimate F, the card object is left in memory.

At time t(25) the card object is again accessed, and elapsed time E from the reference date is calculated to be 17. The current version of the card object is still valid. Since the elapsed time E is greater than the freshness estimate F the freshness estimate F is revised up to 11.4[a=10+0.2(17−10)] and the reference date is updated to 25.

At time t(30), the maintenance method is invoked. The elapsed time E from the reference date is 5. The freshness estimate F is 11.4. Therefore, the card object remains in memory.

At time t(33), the card object is accessed. The elapsed time E is calculated as 8, which is less then the freshness estimate F of 11.4. The current version is still valid, therefore, the freshness estimate F remains at 11.4 and the reference date is updated to 33.

At time t(40), the card object is used. The elapsed time E from the reference date is 7. The freshness estimate F is 11.4. A new version of the card is obtained. Therefore, the freshness estimate is updated to 10.52[a=11.4−(0.2)(11.4−7)]. The reference date is updated to 40.

At time t(45), the maintenance method is invoked. The elapsed time E of 5 is less than the freshness estimate F of 10.52. Therefore, the card object remains in memory.

At time t(55), the card object is used with the elapsed time E at 15 and a freshness estimate F of 10.52. The current version is still valid. Therefore, the freshness estimate is updated to 11.416[a=10.52+(0.2)(15−10.52)]. The reference date is updated to 55.

At time t(60), the maintenance method is invoked. The elapsed time E of 5 is less than the freshness estimate F of 11.416. Therefore, the card object remains in the file.

Finally, at t(75), the maintenance method is invoked. This time, the elapsed time E of 20 is greater than the freshness estimate F of 11.416. The card object is therefore removed from the memory and placed in an archive since it has not been accessed in the allotted time period and is considered to be unreliable.

While the present invention has been described in terms of card objects, the invention can be generalized to apply to other kinds of objects that are subject to some type of version control or that change over time. An object O is defined. The properties of the object are set forth in Tables 1 and 2. The methods of the object are set forth in Table 3 and 4.

TABLE 1

Properties of Object Related to Freshness Metric

| PROPERTY | DESCRIPTION |
| --- | --- |
| Freshness | The current estimated freshness of the object. |
| Valid Date | The date the current version of the object was last known to be valid. |
| Elapsed Time 1 | Elapsed time from Valid Date to current date. |
| Stale | Boolean property derived from Valid Date and Elapsed Time 1 properties. True if Elapsed Time > Freshness, False if Elapsed Time <= Freshness. |

TABLE 2

Properties of Object Related to Interestingness Metric

| PROPERTY | DESCRIPTION |
| --- | --- |
| Interestingness | The current estimated interestingness of the object. |
| Last Used | The date the current version of the object was last used. Usually the same as the Valid Date property. |
| Elapsed Time 2 | The elapsed time from Last Used to the current date Usually the same as the Elapsed Time 1. |
| Survivor | Boolean property derived from Last Used and Elapsed Time 2 properties. True if Elapsed Time > Interestingness, False if Elapsed Time <= Interestingness. |

TABLE 3

Methods Of Object related to Freshness Metric

| METHOD | DESCRIPTION |
| --- | --- |
| Initialize Freshness | Initializes Freshness property to a predetermined value depending on the type of object being created. |
| Increase Freshness | Increments Freshness property and updates Valid Date property to current date. |
| Decrease Freshness | Decrements Freshness property and updates Valid Date property to current date. |
| Set Valid Date | Updates Valid Date Property to current date. |

TABLE 4

Methods Of Object Related to Interestingness Metric

| METHOD | DESCRIPTION |
| --- | --- |
| Interestingness | Initializes the Interestingness property to a predetermined value depending on the type of object being created and other criteria, such as importance. |
| Increase Interestingness | Increments the Interestingness property and updates Last Used property to current date. |
| Set Last Used | Updates Last Used property to current date. |

The following rules summarize the rules for updating the freshness metric apply.

1. If O is being created, then create O and execute initialize Freshness method to set the Freshness property.
2. If O is stale and a new version of O is obtained, then execute Set Valid Date method to update Valid Date property.
3. If O is stale and present version is valid, then execute Increase Freshness method to update Freshness property.
4. If O is not stale and a new version of O is obtained, then execute Decrease Freshness method to update Freshness property.
5. If O is not stale and present version is valid, then execute Set Valid Date method to update Valid Date property.

Similarly, the rules for updating the interestingness metric can be summarized as follows:

1. If O is being created, then create O and execute Initialize Interestingness method to initialize Interestingness property.
2. If O is a survivor (Survivor=True), then execute Increase Interestingness method to update Interestingness property.
3. If O is not a survivor (Survivor=False), then execute Set Last Used method to update Last Used property.

The method of the present invention can be used to define metrics for other attributes of an object in addition to freshness and interestingness. That is, a metric can be defined for any attribute of an object that can be expressed as a function of time. Also, it will be apparent that the invention can also be applied to records in a database. Each record would include fields for the freshness date, and the various time constants.

What is claimed is:

1. A method of managing a database of data objects stored in a memory of a computer, the method comprising:
storing a reference date and a first retention time in association with each data object in the database, wherein the first retention time represents an estimated interval over which the data object should be retained in the database;
updating the reference date of each data object responsive to accessing the data object such that the reference date comprises a last access date for the data object;
adjusting the first retention time of each data object responsive to accessing the data object based on whether the data object being accessed is current or requires updating;
identifying outdated objects in the database by periodically comparing the first retention time for each data object in the database to an elapsed time from the last access date of the data object and a current date of the computer system; and
removing outdated data objects from active use to conserve the memory of the computer.

2. The method of claim 1, wherein the first retention time for each data object comprises a freshness estimate indicating an interval over which contents of the data object are expected to remain current.

3. The method of claim 2, further comprising invoking an update procedure responsive to accessing each data object, wherein the update procedure determines whether the data object being accessed is current or requires updating.

4. The method of claim 3, further comprising increasing the freshness estimate of each data object responsive to accessing the data object where the data object being accessed is current and the freshness estimate is less than an elapsed time between the last access date of the data object and a current date of the computer.

5. The method of claim 4, further comprising decreasing the freshness estimate of each data object responsive to accessing the data object where the data object being accessed requires updating and the freshness alternate is greater than an elapsed time between the last access date of the data object and a current date of the computer.

6. The method of claim 2, further comprising initially setting the freshness estimate for each data object to a default interval value, and then revising the freshness estimate for the date object responsive to the elapsed times between subsequent accesses of the data object.

7. The method of claim 2, further comprising storing a second retention time in association with each data object in the database, wherein the second retention time for each data object is an interestingness estimate indicating an estimated interval over which the data object is expected to remain interesting to a user of the computer.

8. The method of claim 7, wherein identifying outdated objects in the database comprises comparing each of the freshness and interestingness estimates for each data object in the database to the elapsed time between the last access date of the data object and a current date of the computer system.

9. The method of claim 8, wherein removing outdated data object from active use to conserve the memory of the computer comprises removing data objects having at least one of an expired freshness estimate and an expired interestingness estimate.

10. The method of claim 1, wherein removing outdated data objects from active use to conserve the memory of the computer comprises archiving outdated data objects.

11. The method of claim 10, further comprising restoring an archived data abject to active use in the database responsive to an attempted access of the archived data object.

12. The method of claim 1, wherein removing outdated data objects from active use to conserve the memory of the computer comprises deleting outdated data objects.

13. The method of claim 1, wherein identifying outdated objects in the database by periodically comparing the first retention time for each data object in the database to an elapsed time from the last access date of the data object and a current date of the computer comprises periodically executing a memory management routine that performs the comparison between last access dates and the current date for data objects in the database.

14. The method of claim 1, further comprising storing a second retention time in association with each data object in the database, wherein the second retention time for each data object is an interestingness estimate indicating an estimated interval over which the data object is expected to remain interesting to a user of the computer.

15. The method of claim 14, further comprising increasing the interestingness estimate of each data object responsive to the data object being accessed where an elapsed time from the last access date of the data object and a current date of the computer is greater than the interestingness estimate.

16. The method of claim 1, further comprising associating an importance attribute with each data object, wherein the importance attribute defines two or more levels of importance.

17. The method of claim 16, further comprising setting an initial value of the first retention time for each data object based on the importance attribute associated with the data object.

18. The method of claim 16, wherein setting an initial value of the first retention time for each data object based on the importance attribute associated with the data object comprises increasing the initial value of the first retention time with increasing levels of importance such that more important data objects initially have longer retention times than less important data objects.

19. A computer system for managing a database of data objects comprising:
   a memory for storing the database; and
   a processor operative to:
      store a reference date and a first retention time in association with each data object in the database, wherein the first retention time represents an estimated interval over which the data object should be retained in the database;
      update the reference date of each data object responsive to accessing the data object such that the reference date comprises a last access date for the data object;
      adjust the first retention time of each data object responsive to accessing the data object based on whether the data object being accessed is current or requires updating;
      identify outdated objects in the database by periodically comparing the first retention time for each data object in the database to an elapsed time from the last access date of the data object and a current date of the computer system; and
      remove outdated data objects from active use to conserve the memory of the computer.

20. The computer system of claim 19, wherein the first retention time for each data object comprises a freshness estimate indicating an interval over which contents of the data object are expected to remain current.

21. The computer system of claim 20, wherein the processor executes an update procedure responsive to accessing each data object, and wherein the update procedure determines whether the data object being accessed is current or requires updating.

22. The computer system of claim 21, wherein the processor increases the freshness estimate of each data object responsive to accessing the data object where the data object being accessed is current and the freshness estimate is less than an elapsed time between the last access date of the data object and a current date of the computer system.

23. The computer system of claim 21, wherein the processor decreases the freshness estimate of each data object responsive to accessing the data object where the data object being accessed requires updating and the freshness estimate is greater than an elapsed time between the last access date of the data object and a current date of the computer system.

24. The computer system of claim 20, wherein the processor initially sets the freshness estimate for each data object to a default interval value, and then revises the freshness estimate for the data object responsive to the elapsed times between subsequent accesses of the data object.

25. The computer system of claim 20, wherein the processor stores a second retention time in association with each data object in the database, wherein the second retention time for each data object is an interestingness estimate indicating an estimated interval over which the data object is expected to remain interesting to a user of the computer system.

26. The computer system of claim 25, wherein the processor identifies outdated objects in the database by comparing each of the freshness and interestingness estimates for each data object in the database to the elapsed time between the last access date of the data object and a current date of the computer system.

27. The computer system of claim 26, wherein the processor removes outdated data objects from active use to conserve the memory of the computer by removing data objects having at least one of an expired freshness estimate and an expired interestingness estimate.

28. The computer system of claim 19, wherein the processor removes outdated data objects from active use to conserve the memory of the computer by archiving outdated data objects.

29. The computer system of claim 28, wherein the processor restores an archived data object to active use in the database responsive to an attempted access of the archived data object.

30. The computer system of claim 19, wherein the processor removes outdated data objects from active use to conserve the memory of the computer by deleting outdated data objects.

31. The method of claim 19, wherein the processor identifies outdated objects in the database by periodically executing a memory management routine that performs the comparison between last access dates and the current date for data objects in the database.

32. The computer system of claim 19, wherein the processor store a second retention time in association with each data object in the database, wherein the second retention time for each data object is an interestingness estimate indicating an estimated interval over which the data object is expected to remain interesting to a user of the computer system.

33. The computer system of claim 32, wherein the processor increases the interestingness estimate of each data object responsive to the data object being accessed where an elapsed time from the last access date of the data object and a current date of the computer system is greater than the interestingness estimate.

34. The computer system of claim 19, wherein the processor associates an importance attribute with each data object, wherein the importance attribute defines two or more levels of importance.

35. The computer system of claim 34, wherein the processor sets an initial value of the first retention time for each data object based on the importance attribute associated with the data object.

36. The computer system of claim 35, wherein the processor increases the initial value of the first retention time with increasing levels of importance such that more important data objects initially have longer retention times than less important data objects.

* * * * *